United States Patent [19]

Singleton

[11] 3,868,302

[45] Feb. 25, 1975

[54] THERMAL SHIELD OF A NUCLEAR REACTOR

[75] Inventor: Norman R. Singleton, Pittsburgh, Pa.

[73] Assignee: Westinghouse Electric Corporation, Pittsburgh, Pa.

[22] Filed: May 12, 1971

[21] Appl. No.: 142,581

[52] U.S. Cl. .......................... 176/87, 176/50, 176/33, 176/38

[51] Int. Cl. .......................... G21c 11/08

[58] Field of Search .......................... 176/87, 33, 50, 51, 38

[56] References Cited

UNITED STATES PATENTS

| | | | |
|---|---|---|---|
| 3,140,982 | 7/1964 | Haines et al. | 176/38 |
| 3,158,543 | 11/1964 | Sherman | 176/50 |
| 3,212,979 | 10/1965 | Silverblatt | 176/50 |
| 3,260,650 | 7/1966 | Kalk et al. | 176/33 |
| 3,378,449 | 4/1968 | Roberts et al. | 176/33 |

*Primary Examiner*—Reuben Epstein

[57] ABSTRACT

The thermal shield for the core of a nuclear reactor in which the core has portions closer to the inner wall than other portions has an increased thickness adjacent the portions closer to the wall.

7 Claims, 5 Drawing Figures

FIG. 5
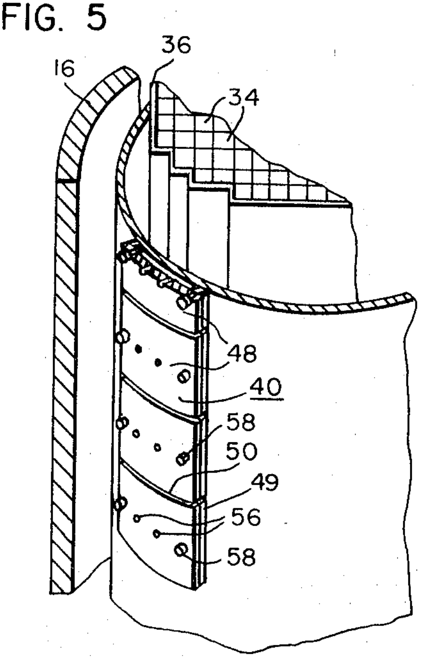
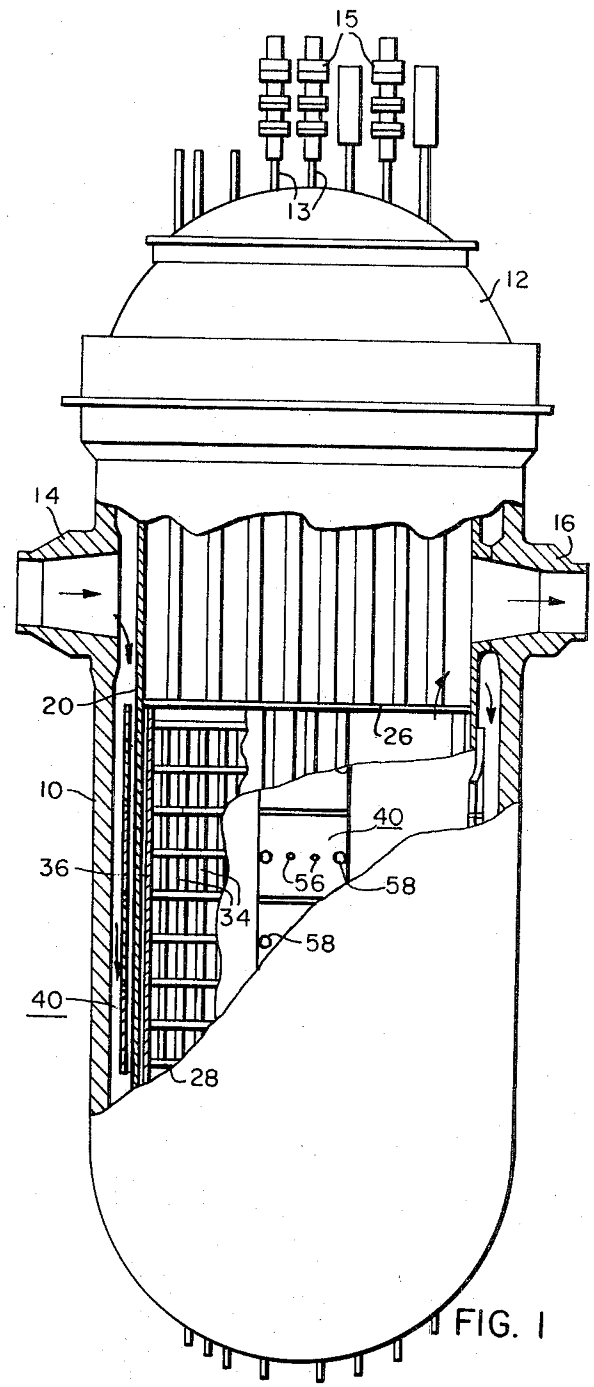
FIG. 1
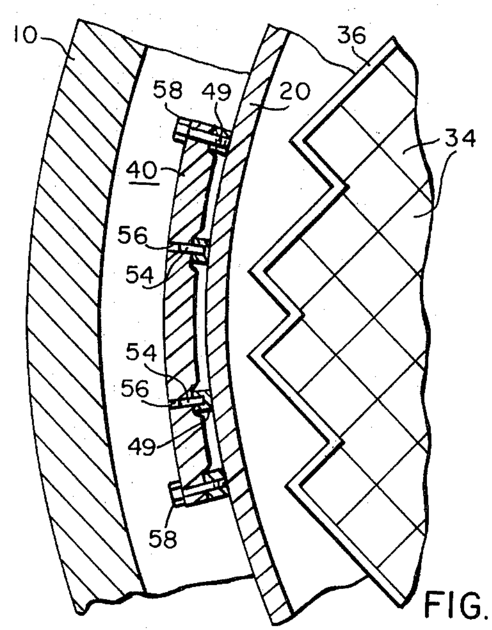
FIG. 4

THERMAL SHIELD OF A NUCLEAR REACTOR

BACKGROUND OF THE INVENTION

This invention pertains to means for reducing the radiation exposure of nuclear reactor vessels, and more particularly to the shielding of nuclear reactor cores.

The level of radiation impinging on the reactor vessel increases as the amount of water and steel between the periphery of the core and the inner surface of the reactor vessel decreases. Since a given thickness of steel reduces the radiation level approximately twice as much as an equal thickness of water, reactor manufacturers have often utilized steel thermal shields to reduce the exposure of the reactor vessel to an adequate level.

In pressurized water reactors, the nuclear core is contained and surrounded by a fabricated baffle structure of a generally rectangular configuration. The baffle structure is attached to the core-barrel by plate means which achieve the transition from the rectangular geometry of the core to the cylindrical geometry of the core-barrel. The core-barrel is generally displaced from the inside surface of the pressure vessel and an annular flow path is formed therebetween. A cylindrical thermal shield is generally attached to the core-barrel and situated approximately an equal distance from the inner surface of the pressure vessel and the outer surface of the core-barrel. Since the thermal shield is located in a flow stream of relatively high velocity and experiences a thermal growth unequal to that of the core barrel to which it is attached, it is a difficult component to design and has historically been a major item of expense to reactor manufacturers.

Two schemes have been historically proposed for eliminating the necessity for a thermal shield. One approach is to increase the thickness of the core-barrel such that it equals the thickness of the usual core-barrel plus that of the usual thermal shield. This scheme suffers in that the cost of such a thick core barrel is prohibitive. The other scheme is to allow the reactor vessel to receive high doses in the absence of the thermal shield and to anneal the reactor vessel when the integrated dose reaches a maximum allowable limit. Because of the difficulty of annealing a reactor vessel and the costs incurred thereby, this scheme has not been popular.

Certain reactors which have lately incurred difficulties with the mechanical stability of the thermal shield, have removed same at great expense and have removed the outermost fuel assemblies to compensate for the absence of the thermal shield. The penalty in the production of electric power has made this approach undesirable.

SUMMARY OF THE INVENTION

The problems incurred by the inclusion of a thermal shield within a nuclear reactor can be minimized by increasing the thickness of the lower core barrel selectively in those regions where a high flux exists.

The neutron flux level impinging on the inside of a reactor vessel varies markedly in the circumferential direction. For core configurations which are generally rectangular, the highest flux levels are in the vicinity of the corners of the rectangular configuration. In accordance with this invention, the lower core-barrel metal thickness is increased selectively in those regions proximate the corners of the core. If the added thickness is made equal to the thickness of the normally included thermal shield, the maximum radiation exposure is essentially the same as the level that would result with a separate cylindrical thermal shield. The region of increased thickness should extend about the circumference of the core sufficiently to insure that the vessel exposure does not exceed a maximum value at any point.

An increase in the thickness of the lower core barrel may be achieved by affixing steel plates thereto. The steel plates may cover an arc of 20° to 30°, and for the usual core, would be situated on 45° axes which intersect the corners of the core when viewed from above. The steel plates may suitably be bolted and doweled to the core-barrel. The inside surface of the plates may be separated slightly from the core-barrel to permit cooling water to flow between the core-barrel and the plates. Depending upon the thermal growth differential between the steel plates and the core-barrel overlapping plates may be utilized to achieve the required overall lengths. The several plates may then have mitered joints between them to prevent local leakage of neutrons. These plates may then move relative to each other so as to minimize the thermal stresses due to differential expansion. For some internal configurations, the steel plates may be located on the inside of the core-barrel or may even form a part of the core-barrel structure, as casted.

DESCRIPTION OF THE DRAWINGS

For a better understanding of the invention, reference may be had to the accompanying illustrative embodiment in which:

FIG. 1 is a partially sectioned view in elevation of a nuclear reactor incorporating the improvement of this invention;

FIG. 4 is an expanded view of a section of FIG. 2; and

FIG. 5 is an isometric view of the reactor internals proximate a corner of the nuclear core.

DESCRIPTION OF THE PREFERRED EMBODIMENTS

Figure 2:
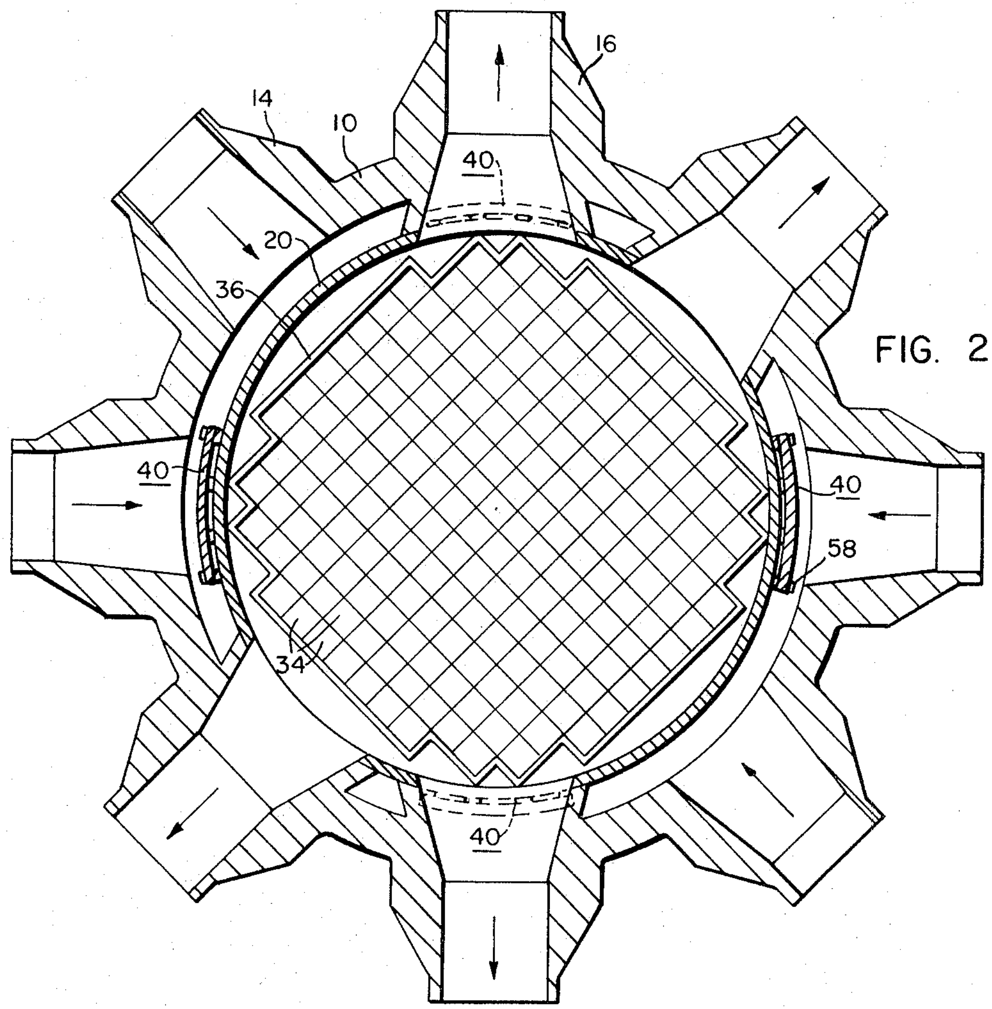
FIG. 2 is a cross-sectional view at the inlet and outlet level looking downwardly.

Referring to the drawings, and more particularly to FIGS. 1 and 2, there is illustrated a nuclear reactor incorporating the vessel shield means of this invention. A pressure vessel 10 is shown which forms a tight pressurized container when sealed by a head assembly 12. The pressure vessel 10 has coolant flow inlet means 14 and coolant flow outlet means 16 affixed in and through the walls thereof. The head assembly 12 has a plurality of head penetration adapters 13 sealed in and through its substantially hemispherical wall. The head penetration adaptors 13 are aligned parallel with the axis of the pressure vessel 10 and receivably support mechanisms 15 which actuate control rods (not shown) to stabilize and control the reactor in a manner well known in the art. A core-barrel 20 is supportedly suspended from an inwardly extending projection just below the top of the pressure vessel 10, and an upper support plate (not shown), an upper core plate 26, and a lower core plate 28 are also substantially supported by the same inward projection. The lower end of the core-barrel 20 is closed by a heavy wall bottom section having numerous holes therein. The region between the upper core plate 26 and the lower core plate 28 is filled with a plurality of fuel assemblies 34; all of which are substantially identical. The parallel array of fuel assemblies 34 include a plurality of fuel rods (not shown) with guide tubes (not shown) interspersed therebetween and held in a fixed relationship each to the other by an egg crate type grid structure of well known construction in the art. A baffle 36 surrounds the assemblies 34 and lends additional support thereto. The baffle 36 fits tightly to the outward contours of the grouping of fuel assemblies 34 and may be constructed from a plurality of straight sections such that the outward configuration of the core is generally rectangular, i.e., made up of a plurality of rectangles overlaid. The baffle 36 may be laterally supported by and affixed to the core barrel 20 with the plurality of separator plates (not shown).

In the absence of shielding between the core barrel 20 and the pressure vessel 10, the flux dosage of the vessel 10 would depend upon the amount of moderating fluid and steel between the outward periphery of the nuclear core and the inner wall of the pressure vessel 10. In the absence of such shielding, this dosage might be such as to necessitate a periodic annealing of the pressure vessel 10. Such a procedure is extremely complicated and expensive. In accordance with this invention, the thickness in structural and shielding material interposed between the nuclear core and the inner wall of the pressure vessel 10 is increased in those regions adjacent those portions of the nuclear core which are closest to the inner wall of the pressure vessel 10. Thus, instead of interposing a cylindrical thermal shield between the core-barrel 20 and the inner wall of the reactor vessel, steel plates can be affixed to either the core-barrel 20 or the pressure vessel 10 in those regions where the pressure vessel would otherwise be subject to maximum neutron flux; said plates being generally designated by the numeral 40.

Figure 3:
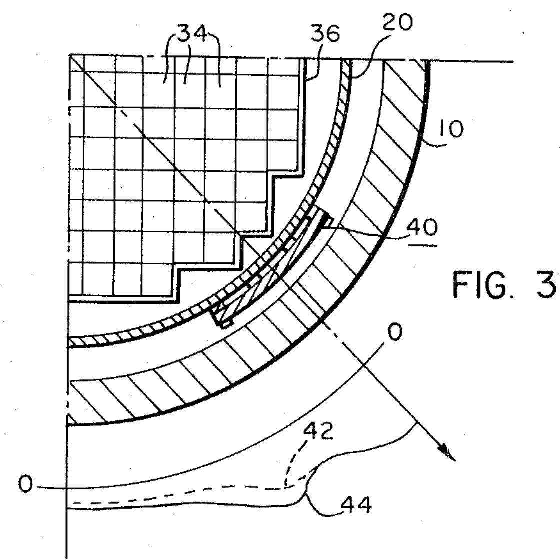
FIG. 3 depicts a comparison of the flux levels with a full thermal shield and the shielding of this invention.

Curves 42 and 44 in FIG. 3 show a comparison of the flux distribution at the inner surface of the pressure vessel 10 under the current practice and with the new arrangement. Curve 42 designates the flux distribution under the current practice and curve 44 shows the flux distribution which would be present with the arrangement of this invention. As can be seen, the maximum flux is identical in both cases although intermediate flux levels are slightly higher with the new arrangement. In other words, the new arrangement has for its purpose a reduction of the maximum flux levels from levels which would exist in the absence of shielding while allowing intermediate flux values to be slightly increased due to a lack of thermal shielding surrounding certain portions of the core, i.e., those portions being farthest from the inner wall of the pressure vessel 10.

In a preferred embodiment in accordance with this invention, the partial thermal shield 40 includes a plurality of shield segments 48 which abutt along mitered joints 50 (see FIG. 5). The inner surfaces of the segmented shields 48 are affixed through blocks 49 to the core barrel 20 to allow coolant flow to pass between the core-barrel 20 and the shields 48 so as to reduce the thermal stresses acting on same (see FIG. 4). The individual segmented shields 48 may be bolted or otherwise suitably affixed to the core barrel 20. A suggested connecting structure is shown most clearly in FIG. 4. Blocks 49 are first welded to the core-barrel 20. The shield segments 48 are provided with cut-backs 54 which properly locate the segments 48 with respect to the blocks 49. Dowel pins 56 are then pressed through the segments 48 and the blocks 49 into the core-barrel 20. Sufficient pins 56 are utilized to assume a substantial portion of the shear stress due to thermal growth. The segments are then affixed to the core-barrel 20 with long bolts 58 which threadedly engage the core-barrel 20. The holes for the bolts 58 should be oversized to minimize shearing action on the bolts 58.

Alternative configurations contemplated include the affixing of the shielding means 40 to the inside of the core-barrel 20 should sufficient space exist between the core-barrel 20 and the baffle 36 surrounding the nuclear core. Also contemplated is affixing the shield 40 to the inside surface of the reactor vessel 20. These various embodiments are all suitable for reducing the maximum flux impinging upon those regions of the reactor vessel most proximate the nuclear fuel.

I claim as my invention:

1. A nuclear reactor including, in combination:

an elongated upstanding pressure vessel;

an elongated upstanding nuclear core within said pressure vessel comprising a plurality of fuel assemblies, said fuel assemblies being situated in side-by-side relationship such that the core has a generally rectangular configuration in plan view with some portions of the core closer to the inner side wall of the pressure vessel than other portions;

supportive and shielding structures being interposed between the nuclear core and the pressure vessel and coextending at least in part with the longitudinal dimension of said elongated core, the coextending parts of said interposed structures having an increased thickness adjacent said some portions.

2. The nuclear reactor of claim 1 wherein the interposed structure includes a cylindrical core-barrel supported by said pressure vessel and surrounding said nuclear core and wherein the core-barrel is of an increased thickness adjacent said some portions.

3. The nuclear reactor of claim 2 wherein the increased thickness of the core-barrel is achieved by affixing plates to the core-barrel adjacent said some portions.

4. The nuclear reactor of claim 3 wherein blocks are interposed between the core-barrel and the plates to provide coolant channels therebetween.

5. A nuclear reactor including, in combination:

an upstanding pressure vessel;

an elongated upstanding nuclear core within said pressure vessel comprising a plurality of fuel assemblies, said fuel assemblies being situated in side-by-side relationship such that the core has a generally rectangular configuration in plan view with some portions of the core closer to the inner side wall of the pressure vessel than other portions;

means for supporting and positioning said nuclear core within said vessel;

thermal shield means interposed between said vessel and said core and positioned outwardly of the periphery of said core, said thermal shield means coextending with the longitudinal dimension of said core and said thermal shield means having portions of increased thickness along its dimension which coextends with said longitudinal dimension of said core, said portions of said thermal shield means being positioned adjacent said some portions of said core.

6. The nuclear reactor of claim 5 including:

means for supporting and positioning said nuclear core within said vessel;

said thermal shield means being formed at least in part by said supporting and positioning means to shield said vessel from said core.

7. The nuclear reactor of claim 3 wherein said plates are metallic.

* * * * *